UNITED STATES PATENT OFFICE.

KARL SCHNITZSPAHN, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

MORDANT AZO DYE AND PROCESS OF MAKING SAME.

No. 887,348.    Specification of Letters Patent.    Patented May 12, 1908.

Application filed January 7, 1908. Serial No. 409,657.

*To all whom it may concern:*

Be it known that I, KARL SCHNITZSPAHN, doctor of philosophy, chemist, a subject of the German Emperor, and resident of Offenbach-on-the-Main, Germany, whose post-office address is Obermainstrasse No. 81, have invented new and useful Improvements in Mordant Azo Dyestuffs and Processes of Making Same, of which the following is a specification.

I have found that valuable mordant azo dyestuffs can be produced by combining the diazo-compounds of ortho-aminophenol and its derivatives of the general formula:

$$C_6H_2.X.Y.O_1H.N_2H_2,$$

wherein X and Y means $$H, CH_3, Cl, NO_2, COOH, SO_3H, NH.CO.CH_3.$$

with hetero nuclear aryl-alpha-naphthyl-amin-beta-sulfonic acids, for example aryl 1:6 and 1:7 naphthylamin sulfonic acids, or with the mixture obtained by arylizing the technical product of both acids. The red to violet tints produced by these ortho-oxyazo-dyestuffs on wool from acid bath are changed by subsequent treatment with chromates in deep violet to black shades, showing a very good fastness to milling, potting, steaming and light.

Compared with the corresponding ortho-oxyazodyestuffs, obtained from nonarylized 1:6 and 1:7 naphthylamin sulfonic acids, the new dyestuffs show a very great increase of coloring power.

The following examples will serve to further illustrate the nature of my invention. The parts are by weight.

Example I: 16.8 parts of nitroamino-cresol $NO_2:NH_2:OH:CH_3 = 5:3:4:1$ are dissolved in 35 parts of hydrochloric acid 20° Bé. and the sufficient quantity of water, and diazotized by means of 6.9 parts of sodium nitrite. An aqueous solution of 32.1 parts of the sodium salt of the technical product of phenyl-1:6-and-1:7-naphthylamin sulfonic acid is poured into the solution of the diazo-compound. The formation of dyestuff begins at once and may be finished by stirring for several hours at a temperature of about 30° C. The coloring matter may be precipitated by means of common salt, filtered off, dried and ground with 6 parts of calcined sodium carbonate. The thus obtained dyestuff is a black brown powder dissolving in concentrated sulfuric acid with a blue, in water with a bordeaux color. By the addition of hydrochloric acid to the aqueous solution a blue violet precipitate is obtained and a violet brown one by the addition of caustic soda lye. The dyestuff dyes wool from acid bath bordeaux shades which by subsequent treatment with chromates are changed into black ones.

Example II: A solution of 21 parts of the sodium salt of nitro-chloro-aminophenol $NO_2:NH_2:Cl:OH = 6:2:4:1$ is diazotized by means of 35 parts of hydrochloric acid 20° Bé. and 6.9 parts of sodium nitrite. The diazo-solution is added to an aqueous solution of 33.5 parts of the sodium salt of the technical product of paratolyl-1:6-and-1:7-naphthyl-amin sulfonic acid containing 27.2 parts of crystallized sodium acetate. The formation of the dyestuff begins at once and may be finished by stirring for several hours at a temperature of about 20°–30° C. The separated dyestuff is filtered off, dried and ground with 6 parts of calcined sodium carbonate. It is a black brown powder dissolving in concentrated sulfuric acid with a blue, and in water with a violet color. By the addition of hydrochloric acid to the aqueous solution a blue violet precipitate is obtained and a brown violet one by the addition of caustic soda lye. The dyestuff dyes wool from acid bath violet tints which, by subsequent treatment with chromates are changed into bright blue black ones.

The tinctorial properties of a greater number of the new dyestuffs may be shown by the following table:

| Dyestuff | | Dyes wool | |
|---|---|---|---|
| obtained by combining the diazocompound of | with | from acid bath: | by subsequent treatment with chromates: |
| Ortho-aminophenol | Phenyl-1:6-and-1:7-naphthyl-amin sulfonic acid. | Yellow red | Violet. |
| Chloroaminophenol Cl:NH$_2$:OH=4:2:1. | ....do.... | Red | Black-violet. |
| Nitroaminophenol NO$_2$:NH$_2$:OH=4:2:1. | ....do.... | Red | Brown violet. |
| Picramicacid | ....do.... | Red brown. | Brown. |
| Chloroaminophenol-sulfonic acid Cl:NH$_2$:OH:SO$_3$H=4:2:1:6. | ....do.... | Bordeaux. | Violet. |
| Nitroaminophenol NO$_2$:NH$_2$:OH=5:2:1. | Paratolyl-1:6- and-1:7-naphthylamin sulfonic acid. | Violet | Blue black. |
| Acetamino-o-aminophenol NH.CO CH$_3$: NH$_2$:OH=4:2:1. | Paratolyl-1:6- and-1:7-naphthylamin sulfonic acid. | Red | Violet-black. |
| Diochloroaminophenol Cl:Cl:NH$_2$OH=4:6:2:1. | Paratolyl-1:6- and-1:7-naphthylamin sulfonic acid. | Bordeaux. | Violet black. |
| Nitrochloroaminophenol NO$_2$:Cl:NH$_2$:OH=6:4:2:1. | ....do.... | Violet | Blue black. |
| Nitroamino-p-oxybenzoic acid. | ....do.... | Violet | Blue black. |
| Amino cresol NH$_2$: OH:CH$_3$=3:4:1. | Orthoanisyl-1:6- and-1:7-naphthylamin sulfonic acid. | Brown | Black brown. |
| Nitroamino cresol NO$_2$:NH$_2$:OH:CH$_3$= 5:3:4:1. | Xylyl-1:6=-and-1:7-naphthylamin sulfonic acid (obtained from technical xylidin). | Bordeaux. | Violet. |

Now what I claim and desire to secure by Letters Patent is the following:

1. The process of manufacturing new mordant monoazo dyestuffs, which consists in combining the diazo compounds of ortho-amino-phenol bodies of the general formula:

$$C_6H_2.X.Y.O_1H.N_2H_2$$

wherein X and Y means $$H.CH_3.Cl.NO_2.COOH.SO_3H.NH.CO.CH_3$$

with heteronuclear aryl-alpha-naphthyl-amin-beta-sulfonic acids.

2. As a new article of manufacture the mordant monoazo dyestuffs obtained by combining the diazo compounds of ortho-amino-phenol bodies of the general formula:

$$C_6H_2.X.Y.O_1H.N_2H_2$$

wherein X and Y may be $$H.CH_3.Cl.NO_2.COOH.SO_3H.NHCO CH_3$$

with heteronuclear aryl-alpha-naphthylamin beta-sulfonic acids, the sodium salts thereof forming brown black powders, dissolving in concentrated sulfonic acid with a violet to blue, and in water with a brownish red to violet color, in which solution a violet to blue precipitate is obtained by the addition of hydrochloric acid and a brown violet one by the addition of caustic soda lye, dyeing wool from an acid bath red to violet tints, which by subsequent treatment with chromates are changed into violet to black ones.

In testimony, that I claim the foregoing as my invention, I have signed my name in presence of two witnesses, this twenty fourth day of December 1907.

KARL SCHNITZSPAHN.

Witnesses:
 HERMANN WEIL,
 EVA SATTLER.